(12) United States Patent
Wen et al.

(10) Patent No.: US 10,448,260 B2
(45) Date of Patent: Oct. 15, 2019

(54) MANAGEMENT APPARATUS AND RADIO COMMUNICATION SYSTEM

(71) Applicant: FUJITSU LIMITED, Kawasaki-shi, Kanagawa (JP)

(72) Inventors: Yun Wen, Kawasaki (JP); Takayoshi Nakayama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 4 days.

(21) Appl. No.: 15/809,748

(22) Filed: Nov. 10, 2017

(65) Prior Publication Data

US 2018/0176796 A1 Jun. 21, 2018

(30) Foreign Application Priority Data

Dec. 15, 2016 (JP) .................. 2016-243651

(51) Int. Cl.
*H04W 16/22* (2009.01)
*H04W 24/02* (2009.01)
*H04L 12/26* (2006.01)
*H04W 24/08* (2009.01)
*H04W 72/04* (2009.01)
*H04W 88/18* (2009.01)

(52) U.S. Cl.
CPC ......... *H04W 16/22* (2013.01); *H04L 43/0888* (2013.01); *H04W 24/02* (2013.01); *H04W 24/08* (2013.01); *H04W 72/0486* (2013.01); *H04W 72/044* (2013.01); *H04W 88/18* (2013.01)

(58) Field of Classification Search
CPC ... H04W 16/22; H04W 24/08; H04W 72/044; H04W 72/0486; H04W 88/18; H04L 43/0888
See application file for complete search history.

(56) References Cited

U.S. PATENT DOCUMENTS

| 9,301,159 | B1 * | 3/2016 | Marupaduga | ......... H04W 24/02 |
| 9,775,069 | B1 * | 9/2017 | Jorgovanovic | .... H04W 28/0236 |
| 2012/0243410 | A1 * | 9/2012 | Vedula | ................ H04L 41/5025 370/235 |
| 2013/0053039 | A1 * | 2/2013 | Jorguseski | ............ H04W 24/02 455/436 |

(Continued)

FOREIGN PATENT DOCUMENTS

JP 2006-005768 A 1/2006

*Primary Examiner* — Jenee Holland
(74) *Attorney, Agent, or Firm* — Arent Fox LLP

(57) ABSTRACT

A management apparatus includes a processor configured to acquire first throughputs of respective first terminals. The first throughputs are throughputs between a base station device and the respective first terminals. The base station device provides a third amount of radio resources. The processor is configured to calculate a first amount of the radio resources used by the first terminals on the basis of the first throughputs. The processor is configured to calculate a second amount of the radio resources used by second terminals on the basis of the first amount and the third amount. The processor is configured to calculate a first after-change amount on the basis of the first amount and the second amount. The first after-change amount is an amount of the radio resources used by after-change terminals. The processor is configured to estimate after-change throughputs on the basis of the first after-change amount.

13 Claims, 12 Drawing Sheets

(56) References Cited

U.S. PATENT DOCUMENTS

| | | | |
|---|---|---|---|
| 2014/0219122 A1* | 8/2014 | Nakamura | H04W 24/10 370/252 |
| 2015/0195737 A1* | 7/2015 | Tabet | H04L 43/0888 455/405 |
| 2015/0245358 A1* | 8/2015 | Schmidt | H04L 43/0888 370/329 |
| 2016/0191363 A1* | 6/2016 | Haraszti | H04L 41/0896 709/223 |
| 2016/0191631 A1* | 6/2016 | Haraszti | H04L 67/14 709/227 |
| 2016/0212034 A1* | 7/2016 | Shomura | H04L 43/0888 |
| 2017/0006480 A1* | 1/2017 | Huang | H04W 24/02 |
| 2017/0149636 A1* | 5/2017 | Yu | H04L 43/08 |
| 2017/0171052 A1* | 6/2017 | Kish | H04W 24/02 |

* cited by examiner

FIG. 5

| TERMINAL DEVICE | COUPLED BASE STATION DEVICE | BASE STATION DEVICE TO BE COUPLED | THROUGHPUT (Mbps) | COMMUNICATION RATE (Mbps/(NUMBER OF RBs)) | USED-RESOURCE AMOUNT (NUMBER OF RBs) |
|---|---|---|---|---|---|
| 100-1 | 200-1 | - | 2.5 | 1.0 | (2.5/1.0) 2.5 |
| 100-2 | 200-1 | - | 5.0 | 2.0 | (5.0/2.0) 2.5 |
| 100-3 | - | 200-1 | - | 1.0 | - |

| TERMINAL DEVICE | COUPLED BASE STATION DEVICE | THROUGHPUT (Mbps) | COMMUNICATION RATE (Mbps/(NUMBER OF RBs)) | USED-RESOURCE AMOUNT (NUMBER OF RBs) |
|---|---|---|---|---|
| 100-1 | 200-1 | 2.0 | 1.0 | 2.0 |
| 100-2 | 200-1 | 4.0 | 2.0 | 2.0 |
| 100-3 | 200-1 | 2.0 | 1.0 | 2.0 |

FIG. 9

| TERMINAL DEVICE | COUPLED BASE STATION | BASE STATION DEVICE TO BE COUPLED | THROUGHPUT (Mbps) | COMMUNICATION RATE (DATA TRANSMISSION TIME) (msec) | PACKET SIZE (bit) |
|---|---|---|---|---|---|
| 100-1 | 200-1 | - | 2.0 | 5.0 | 80000 |
| 100-2 | 200-1 | - | 2.0 | 15.0 | 80000 |
| 100-3 | - | 200-1 | - | 20.0 | 80000 |

| TERMINAL DEVICE | COUPLED BASE STATION DEVICE | THROUGHPUT (Mbps) | COMMUNICATION RATE (DATA TRANSMISSION TIME) (msec) | PACKET SIZE (bit) |
|---|---|---|---|---|
| 100-1 | 200-1 | 1.3 | 5.0 | 80000 |
| 100-2 | 200-1 | 1.3 | 15.0 | 80000 |
| 100-3 | 200-1 | 1.3 | 20.0 | 80000 |

FIG. 12A

| TERMINAL DEVICE | COUPLED BASE STATION DEVICE | BASE STATION DEVICE TO BE COUPLED | THROUGHPUT (Mbps) | COMMUNICATION RATE (Mbps/(NUMBER OF RBs)) | USED-RESOURCE AMOUNT (NUMBER OF RBs) |
|---|---|---|---|---|---|
| 100-1 | 200-1 | - | 2.5 | 1.0 | 2.5 |
| 100-2 | 200-1 | - | 5.0 | 2.0 | 2.5 |
| 100-3 | - | 200-1 | - | 1.0 | - |

FIG. 12B

| TERMINAL DEVICE | COUPLED BASE STATION DEVICE | BASE STATION DEVICE TO BE COUPLED | THROUGHPUT (Mbps) | COMMUNICATION RATE (Mbps/(NUMBER OF RBs)) | USED-RESOURCE AMOUNT (NUMBER OF RBs) |
|---|---|---|---|---|---|
| 100-1 | 200-1 | - | 2.0 | 1.0 | 2.0 |
| 100-2 | 200-1 | - | 4.0 | 2.0 | 2.0 |
| 100-3 | 200-1 | - | 2.0 | 1.0 | 2.0 |

MANAGEMENT APPARATUS AND RADIO COMMUNICATION SYSTEM

CROSS-REFERENCE TO RELATED APPLICATION

This application is based upon and claims the benefit of priority of the prior Japanese Patent Application No. 2016-243651, filed on Dec. 15, 2016, the entire contents of which are incorporated herein by reference.

FIELD

The embodiments discussed herein are related to a management apparatus and a radio communication system.

BACKGROUND

In recent years, a mobile communication operator named a mobile virtual network operator (MVNO) has attracted attention. The MVNO borrows a network from another operator (e.g., a mobile network operator (MNO)) who owns the network, and provides mobile communication services to users using the network with its own brand.

In some cases, the MVNO may borrow and use communication lines from multiple MNOs. The MVNO may use two networks, for example, a network conforming to long term evolution (LTE) and a network conforming to a wireless local area network (WLAN). In order for the users to perform a radio communication without delay, the MVNO estimates a throughput for a case where each user of the MVNO accesses to each network, and controls the combination of user terminal device and a network so as to provide an optimum throughput as a whole.

A technique for estimating a throughput has been proposed.

Related techniques are disclosed in, for example, Japanese Laid-Open Patent Publication No. 2006-005768.

SUMMARY

According to an aspect of the present invention, provided is a management apparatus including a memory and a processor coupled to the memory. The processor is configured to acquire first throughputs of respective first terminals from the first terminals. The first throughputs are throughputs between a base station device and the respective first terminals. The base station device provides a third amount of radio resources to a plurality of terminal devices wirelessly coupled to the base station device. The first terminals are part of managed terminals managed by the management apparatus and included in the plurality of terminal devices. The processor is configured to calculate a first amount of the radio resources used by the first terminals on the basis of the first throughputs. The processor is configured to calculate a second amount of the radio resources used by second terminals different from the first terminals on the basis of the first amount and the third amount. The second terminals are included in the plurality of terminal devices. The processor is configured to calculate a first after-change amount on the basis of the first amount and the second amount. The first after-change amount is an amount of the radio resources used by after-change terminals. The after-change terminals are part of the managed terminals and wirelessly coupled to the base station device after a status of coupling the managed terminals to the base station device is changed. The processor is configured to estimate after-change throughputs on the basis of the first after-change amount. The after-change throughputs are throughputs between the base station device and the respective after-change terminals.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of a terminal information table;

FIG. 7 is a diagram illustrating an example of throughputs of managed terminals estimated by a management apparatus;

FIG. 9 is a diagram illustrating an example of a terminal information table;

FIG. 10 is a diagram illustrating an example of throughputs of managed terminals estimated by a management apparatus;

FIG. 12A is a diagram illustrating an example of terminal information before a managed terminal in FIG. 1 is wirelessly coupled to a base station device; and FIG. 12B is a diagram illustrating an example of terminal information after a managed terminal in FIG. 1 is wirelessly coupled to a base station device.

DESCRIPTION OF EMBODIMENTS

There is a case where a network used by a first MVNO is shared and used by a second MVNO different from the first MVNO. In this case, the throughput of a terminal of the first MVNO varies depending on the usage of the network by terminals of the second MVNO. However, since the first MVNO is not capable of acquiring the amount of resources used by the terminals of the second MVNO, throughputs of the terminals of the second MVNO, or the like, the throughput of the terminal of the first MVNO is not estimated with high accuracy.

First Embodiment

A first embodiment will be described. A radio communication system according to the first embodiment includes a management apparatus, base station devices, and a plurality of terminal devices. The terminal devices are wirelessly coupled to a base station device to perform radio communication with the base station device.

The management apparatus manages part (referred to as managed terminals) of the plurality of terminal devices.

The management apparatus acquires, from each of the managed terminals, a throughput between the relevant managed terminal and a base station device wirelessly coupled to the relevant managed terminal.

The management apparatus calculates a first radio resource amount used by the managed terminals on the basis of the acquired throughputs. Then, on the basis of the calculated first radio resource amount and a base station radio resource amount, which indicates the amount of radio resources that the base station device is capable of providing to the plurality of terminal devices, the management apparatus calculates a second radio resource amount used by terminal devices (referred to as unmanaged terminals) other than the managed terminals, which are wirelessly coupled to the base station device. Further, on the basis of the calculated first and second radio resource amounts, the management apparatus calculates the first radio resource amount after the managed terminals wirelessly coupled to the base station device are changed. Then, the management apparatus estimates the respective throughputs of the changed managed terminals on the basis of the calculated first radio resource amount.

Figure 1:
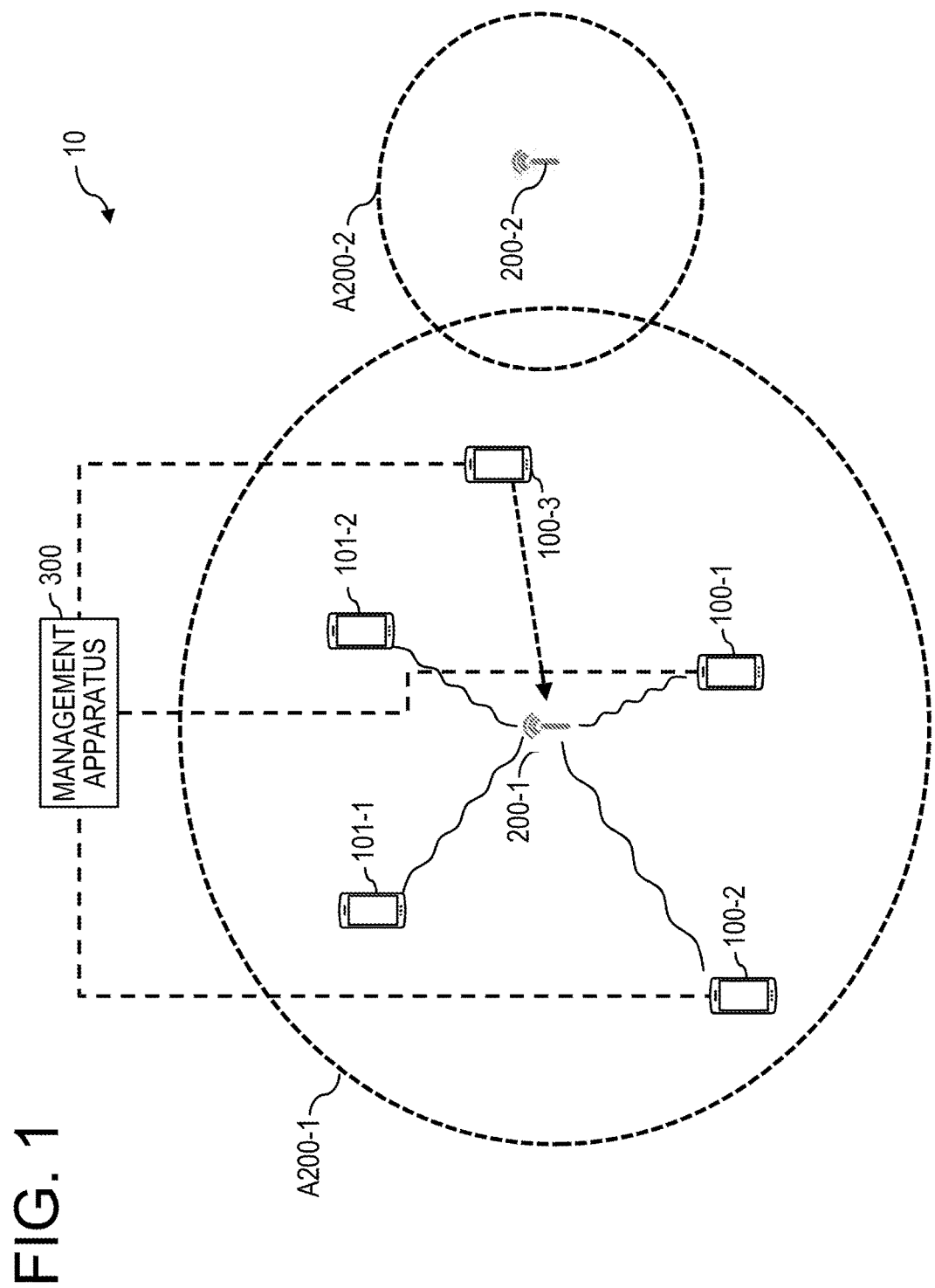
FIG. 1 is a diagram illustrating an exemplary configuration of a radio communication system.

FIG. 1 is a diagram illustrating an exemplary configuration of a radio communication system 10. The radio communication system 10 includes managed terminals 100-1 to 100-3, unmanaged terminals 101-1 and 101-2, base station devices 200-1 and 200-2, and a management apparatus 300. The radio communication system 10 is a radio communication system conforming to a communication standard such as LTE or the like.

The managed terminals 100-1 to 100-3 (hereinafter, sometimes referred to as managed terminals 100) and the unmanaged terminals 101-1 and 101-2 (hereinafter, sometimes referred to as unmanaged terminals 101) are mobile communication devices such as smart phones, tablet terminals, or the like. For example, the managed terminals 100 and the unmanaged terminals 101 are wirelessly coupled to the base station device 200-1 or 200-2. The managed terminals 100 and the unmanaged terminals 101 communicate with other communication devices by exchanging packets including data with the other communication devices via the base station device 200-1 or 200-2.

A managed terminal 100 is a terminal device which is managed by the management apparatus 300. The managed terminal 100 is, for example, a terminal device used by a user who has made a contract with an operator (MVNO) operating the management apparatus 300. For example, the managed terminal 100 communicates with the management apparatus 300 via the base station device 200-1 or 200-2 wirelessly coupled thereto. The managed terminal 100 transmits, for example, terminal information such as the throughput, communication performance, or the like of the managed terminal 100 to the management apparatus 300.

An unmanaged terminal 101 is a terminal device which is not managed by the management apparatus 300. The unmanaged terminal 101 is, for example, a terminal device used by a user who has not made a contract with the operator (MVNO) operating the management apparatus 300. The management apparatus 300 does not acquire terminal information of the unmanaged terminal 101.

The base station devices 200-1 and 200-2 (hereinafter, sometimes referred to as base station devices 200) are wirelessly coupled to terminal devices to relay communication performed by the terminal devices. The base station devices 200-1 and 200-2 have their respective communication areas A200-1 and A200-2. The communication areas refer to ranges in which the respective base station devices 200-1 and 200-2 may be wirelessly coupled to the managed terminals 100 and the unmanaged terminals 101. The base station devices 200 are, for example, eNodeBs in a communication system conforming to LTE.

The management apparatus 300 is an apparatus that manages the managed terminals 100 and is, for example, a server machine. The management apparatus 300 regularly or irregularly acquires terminal information from the managed terminals 100 and stores the acquired terminal information in its internal memory. On the basis of the acquired terminal information, the management apparatus 300 estimates the respective throughputs of the managed terminals 100 when the coupling status of the managed terminals 100 to a base station device 200 is changed. As used herein, the term "the coupling status" indicates the number of managed terminals 100 wirelessly coupled to the base station device 200, the amount of traffic (for example, wireless resource occupancy of the respective terminal devices), the throughput per radio resource amount, etc. As used herein, the phrase "when the coupling status of the managed terminals 100 to the base station device 200 is changed" means, for example, when a managed terminal 100 wirelessly coupled to the base station device 200 is uncoupled, when a managed terminal 100 which is not yet wirelessly coupled to the base station device 200 is newly wirelessly coupled, etc. That is, the phrase "when the coupling status of the managed terminals 100 to the base station device 200 is changed" means, for example, when the number of managed terminals 100 wirelessly coupled to the base station device 200 is increased or decreased.

In FIG. 1, the managed terminals 100-1 and 100-2 are wirelessly coupled to the base station device 200-1. The unmanaged terminals 101-1 and 101-2 are wirelessly coupled to the base station device 200-1. Then, the managed terminal 100-3 located within the communication area A200-1 is newly wirelessly coupled to the base station device 200-1. When the managed terminal 100-3 is newly wirelessly coupled to the base station device 200-1 in addition to the managed terminals 100-1 and 100-2, the management apparatus 300 estimates the respective throughputs of the managed terminals 100-1 to 100-3. An exemplary process performed by the management apparatus 300 will be described below. In the following description, a radio resource amount refers to, for example, a time length and a frequency bandwidth used in wireless communication performed by the managed terminals 100 and the unmanaged terminals 101 (or provided by the base station device 200). The radio resource amount is, for example, a resource block (RB) in LTE. The resource block has, for example, a predetermined time length and a predetermined frequency bandwidth.

The management apparatus 300 acquires from the managed terminals 100-1 and 100-2 throughput between the respective managed terminals 100-1 and 100-2 and the base station device 200-1 wirelessly coupled thereto.

On the basis of the acquired throughputs, the management apparatus 300 calculates a radio resource amount (first radio resource amount) used by each of the managed terminals 100-1 and 100-2.

Then, on the basis of the calculated radio resource amounts of the managed terminals 100-1 and 100-2 and a radio resource amount (base station radio resource amount) which may be provided by the base station device 200-1 to the managed terminals and the unmanaged terminals (hereinafter, sometimes referred to as terminal devices without distinguishing between them), the management apparatus 300 calculates a radio resource amount (second radio resource amount) used by the unmanaged terminals 101.

Then, on the basis of the radio resource amounts of the managed terminals 100 and the unmanaged terminals 101, the management apparatus 300 calculates a radio resource amount used by each of the managed terminals 100-1 to 100-3 when the managed terminal 100-3 is newly wirelessly coupled. Then, the management apparatus 300 estimates the respective throughputs of the managed terminals 100-1 to 100-3 on the basis of the calculated radio resource amounts.

Figure 2:
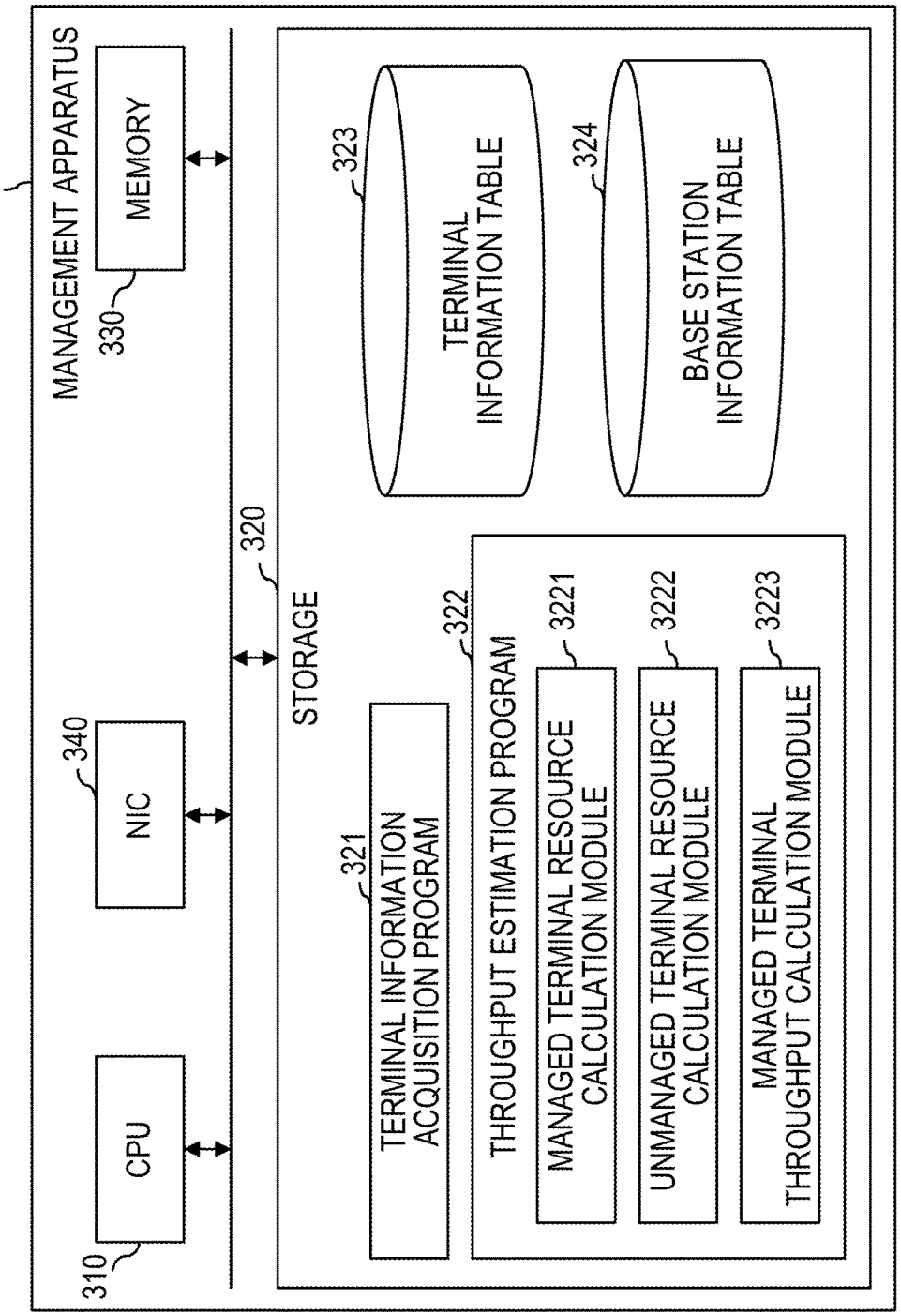
FIG. 2 is a diagram illustrating an exemplary configuration of a management apparatus.

FIG. 2 is a diagram illustrating an exemplary configuration of the management apparatus 300. The management apparatus 300 includes a central processing unit (CPU) 310, a storage 320, a memory 330 such as a dynamic random access memory (DRAM), and a network interface card (NIC) 340.

The storage 320 is an auxiliary storage device such as a flash memory, a hard disk drive (HDD), or a solid state drive (SSD) that stores therein programs and data. The storage 320 stores therein a terminal information acquisition program 321, a throughput estimation program 322, a terminal information table 323, and a base station information table 324.

The terminal information table 323 is a table that stores therein an identifier of a managed terminal 100 and terminal information of the managed terminal 100 in association with each other. The terminal information includes, for example, an identifier of a wirelessly-coupled base station device 200, an identifier of a base station device 200 to be wirelessly coupled, a throughput, a communication rate, a used-resource amount, and the like.

The throughput is a throughput of a managed terminal 100 and is measured by, for example, the managed terminal 100. The unit of the throughput is, for example, Mega bit per second (Mbps).

The communication rate is, for example, a throughput per unit radio resource amount. For example, in the case of LTE, the communication rate is a throughput per 1 RB and is, for example, a numerical value determined depending on the reception power and the degree of interference of a radio wave received by the managed terminal 100 from the base station device 200. The communication rate is the ratio of throughput to radio resource amount. The communication rate may be an effective communication rate taking into consideration an overhead such as an actually measured radio error rate and back-off time in WLAN.

The used-resource amount is a radio resource amount used by (or provided to) a managed terminal 100. In the case of LTE, the used-resource amount is the number of RBs. The details of the terminal information table 323 will be described in the description of a throughput estimation process to be described later.

The base station information table 324 is a table that stores therein base station information in which an identifier of a base station device 200 is associated with a radio resource amount which may be provided by the base station device 200. The management apparatus 300 stores the radio resource amount of the base station device 200 in the base station information table 324, for example, by an operation of an administrator of the management apparatus 300. The management apparatus 300 may acquire and store the radio resource amount of the base station device 200, for example, from the base station device 200 or a server machine that manages the radio resource amount of the base station device 200. The details of the base station information table 324 will be described in the description of the throughput estimation process to be described later.

The memory 330 is an area into which a program stored in the storage 320 is loaded. The memory 330 is also used as an area where a program stores data.

The NIC 340 is a network interface coupled to the base station device 200 and an external network. The management apparatus 300 communicates with the managed terminal 100 by exchanging packets with the managed terminals 100 via the NIC 340.

By executing the terminal information acquisition program 321, the CPU 310 implements an acquisition unit that performs a terminal information acquisition process. The terminal information acquisition process is a process of acquiring the terminal information of a managed terminal 100. In the terminal information acquisition process, the management apparatus 300 receives the terminal information from the managed terminal 100.

By executing the throughput estimation program 322, the CPU 310 implements an estimation unit that performs a throughput estimation process. The throughput estimation process is a process of estimating the respective throughputs of the managed terminals 100 wirelessly coupled to the base station device 200 after the coupling status of the managed terminals 100 to the base station device 200 is changed. The throughput estimation process includes a managed terminal resource calculation process, an unmanaged terminal resource calculation process, and a managed terminal throughput calculation process, which will be described later.

The CPU 310 executes a managed terminal resource calculation module 3221 to perform the managed terminal resource calculation process. The managed terminal resource calculation process is a process of calculating the total sum of the radio resource amounts used by the managed terminals 100 wirelessly coupled to the base station device 200.

The CPU 310 executes an unmanaged terminal resource calculation module 3222 to perform the unmanaged terminal resource calculation process. The unmanaged terminal resource calculation process is a process of calculating the total sum of the radio resource amounts used by the unmanaged terminals 101 wirelessly coupled to the base station device 200.

The CPU 310 executes a managed terminal throughput calculation module 3223 to perform the managed terminal throughput calculation process. The managed terminal throughput calculation process is a process of calculating the respective throughputs of the managed terminals 100 wirelessly coupled to the base station device 200. In the managed terminal throughput calculation process, the management apparatus 300 calculates the number of unmanaged terminals 101 wirelessly coupled to the base station device 200. Next, in the managed terminal throughput calculation process, the management apparatus 300 calculates a radio resource amount to be provided to the managed terminals 100, on the basis of the sum of the number of unmanaged terminals 101 wirelessly coupled to the base station device 200 and the number of managed terminals 100 wirelessly coupled to the base station device 200. Then, in the managed terminal throughput calculation process, the management apparatus 300 calculates respective throughputs of the managed terminals 100 on the basis of the calculated radio resource amount, and estimates the calculated throughputs as respective throughputs of the managed terminals 100 after the change in coupling status.

The programs and tables included in the management apparatus 300 may be included in the base station device 200. When the radio communication system 10 includes a plurality of base station devices 200, the programs and tables included in the management apparatus 300 may be included in one of the plurality of base station devices 200. Further, when the radio communication system 10 includes a control device (e.g., mobility management entity (MME) in LTE) that controls the plurality of base station devices 200, the programs and tables included in the management apparatus 300 may be included in the control device.

Figure 3:
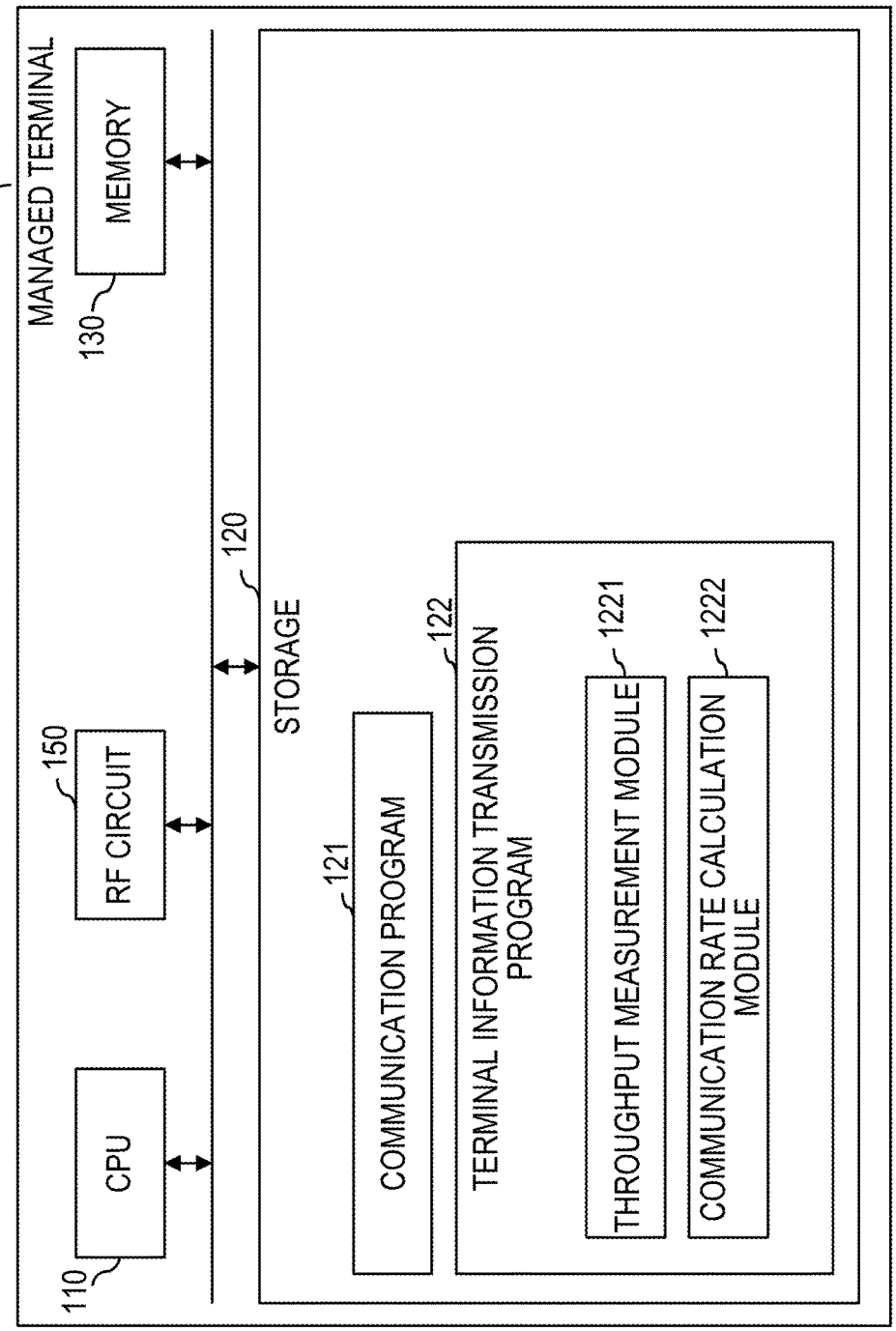
FIG. 3 is a diagram illustrating an exemplary configuration of a managed terminal.

FIG. 3 is a diagram illustrating an exemplary configuration of the managed terminal 100. The managed terminal 100 includes a CPU 110, a storage 120, a memory 130 such as a DRAM, and a radio frequency (RF) circuit 150.

The storage 120 is an auxiliary storage device such as a flash memory, an HDD, or an SSD that stores therein programs and data. The storage 120 stores therein a communication program 121 and a terminal information transmission program 122.

The memory 130 is an area into which a program stored in the storage 120 is loaded. The memory 130 is also used as an area where a program stores data.

The RF circuit 150 is a device that is wirelessly coupled to the base station device 200. The RF circuit 150 includes, for example, an antenna and exchanges radio waves with a base station device 200 wirelessly coupled thereto, to communicate with another communication device.

The CPU 110 executes the communication program 121 to perform a communication process. The communication process is a process of communicating with a communication device serving as a communication partner via the base station device 200. In the communication process, the managed terminal 100 transmits a packet to the communication device serving as the communication partner, for example, via the base station device 200. In addition, in the communication process, the managed terminal 100 receives a packet from the communication device serving as the communication partner, for example, via the base station device 200.

Further, the CPU 110 executes the terminal information transmission program 122 to perform a terminal information transmission process. The terminal information transmission process is a process of measuring a throughput and calculating a communication rate and transmitting (or notifying), as the terminal information, the measured throughput and the calculated communication rate to the management apparatus 300. The terminal information transmission process includes a throughput measurement process and a communication rate calculation process, which will be described later.

The CPU 110 executes a throughput measurement module 1221 to perform the throughput measurement process. The throughput measurement process is a process of measuring a throughput between the managed terminal 100 and the base station device 200 wirelessly coupled thereto.

The CPU 110 executes a communication rate calculation module 1222 to perform the communication rate calculation process. The communication rate calculation process is a process of measuring the reception power and the degree of interference of a radio wave received from the base station device 200 and calculating a communication rate on the basis of a result of the measurement. In the communication rate calculation process, the managed terminal 100 measures, for example, reference signal received quality (RSRQ).

Figure 4:
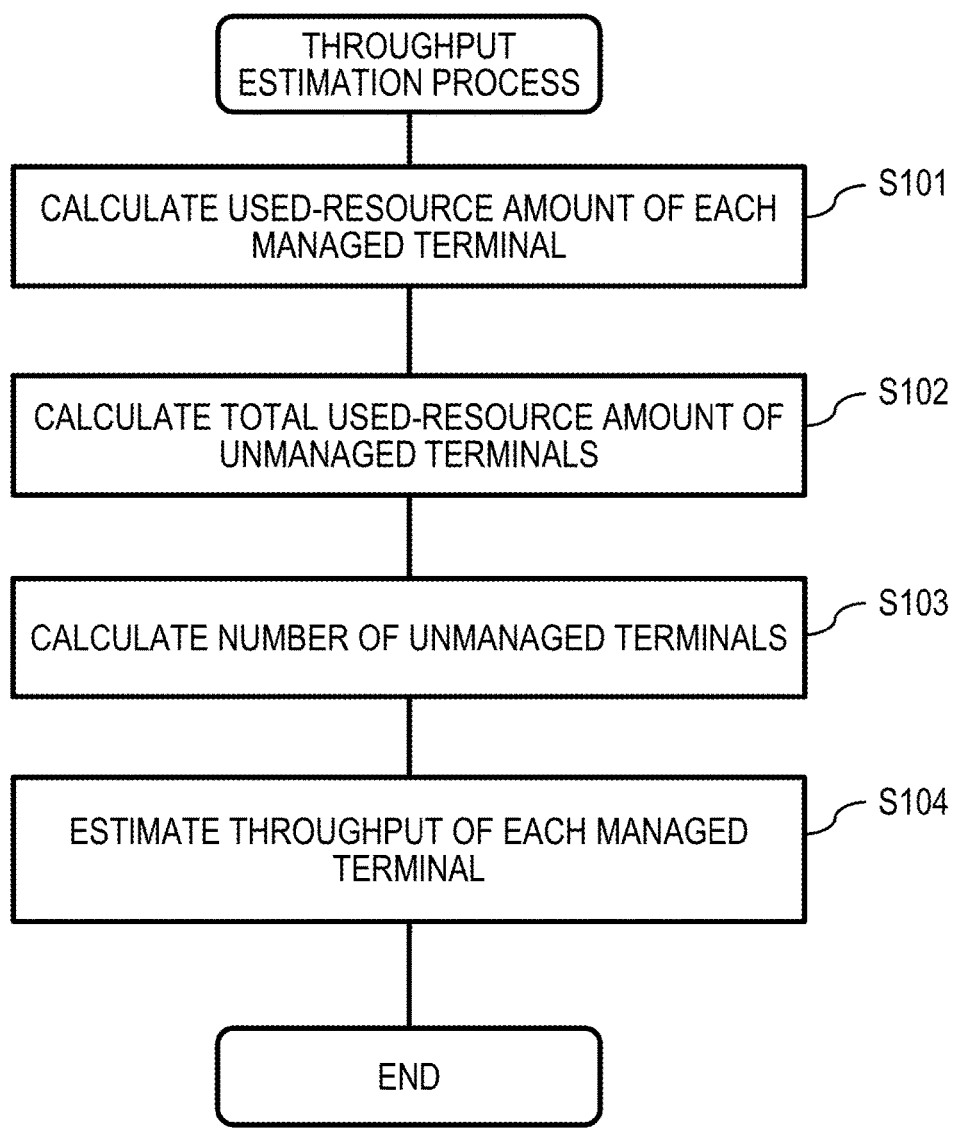
FIG. 4 is a flowchart illustrating a throughput estimation process performed by a management apparatus.

FIG. 4 is a flowchart illustrating the throughput estimation process performed by the management apparatus 300. When an opportunity to perform the throughput estimation process comes, the management apparatus 300 performs the throughput estimation process. The opportunity to perform the throughput estimation process refers to when the possibility of changing the coupling status of the managed terminals 100 is detected, such as when it is detected that a new managed terminal 100 is to be coupled to the base station device 200. Before the coupling status of the managed terminals 100 is changed, the management apparatus 300 estimates a throughput expected to be measured after the coupling status is changed. The flowchart of FIG. 4 will be described below with the assumption that the opportunity to perform the throughput estimation process in the present embodiment is when the management apparatus 300 detects, in FIG. 1, that the managed terminal 100-3 is wirelessly coupled (or is to be wirelessly coupled) to the base station device 200-1.

In the throughput estimation process, the management apparatus 300 calculates a used-resource amount of each managed terminal 100 wirelessly coupled to the base station device 200-1 in relation to which the throughput is to be estimated (S101). The used-resource amount of the managed terminal 100 refers to a radio resource amount used by the managed terminal 100. The management apparatus 300 calculates the used-resource amount on the basis of the terminal information table 323.

FIG. 5 is a diagram illustrating an example of the terminal information table 323. FIG. 5 illustrates an example of the terminal information table 323, for example, at the time when the management apparatus 300 performs the throughput estimation process. The terminal information table 323 stores therein terminal information of the managed terminals 100-1 to 100-3.

For example, the management apparatus 300 acquires a coupled base station device, a base station device to be coupled, a throughput, and a communication rate from the managed terminals 100-1 to 100-3. Then, the management apparatus 300 calculates the used-resource amount of each managed terminal 100 and stores the calculated used-resource amount in the terminal information table 323. The used-resource amount of each managed terminal 100 is calculated on the basis of the following Equation (1).

$$TP_i = RS_i \times RT_i \qquad (1)$$

In Equation (1), $TP_i$ represents a throughput of a terminal device i, $RS_i$ represents a used-resource amount of the terminal device i, and $RT_i$ represents a communication rate of the terminal device i. The management apparatus 300 calculates the used-resource amount on the basis of the throughput and communication rate of the relevant managed terminal 100 and Equation (1). The management apparatus 300 calculates the used-resource amounts of the managed terminals 100-1 and 100-2 as 2.5 (2.5/1.0) and 2.5 (5.0/2.0), respectively.

Returning to the flowchart of FIG. 4, the management apparatus 300 calculates a total used-resource amount of the unmanaged terminals 101 wirelessly coupled to the base station device 200-1 (S102). On the basis of the used-resource amount of each managed terminal 100 and a radio resource amount (hereinafter, sometimes referred to as an allocable-resource amount) that may be allocated by the base station device 200-1, the management apparatus 300 calculates the total used-resource amount of the unmanaged terminals 101.

Figure 6:
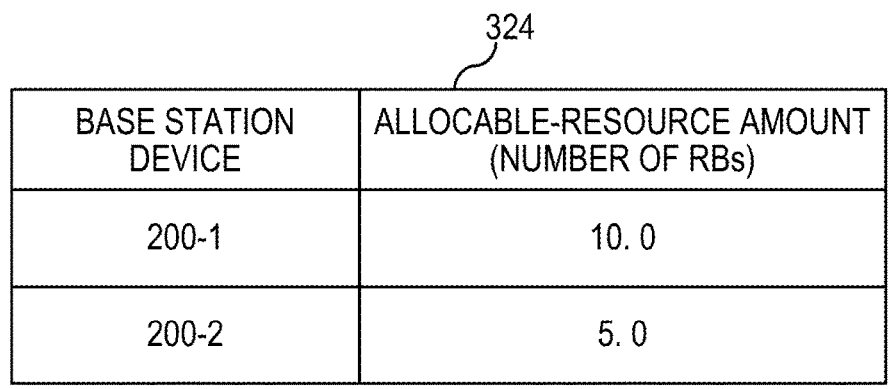
FIG. 6 is a diagram illustrating an example of a base station information table.

FIG. 6 is a diagram illustrating an example of the base station information table 324. The base station information table 324 illustrated in FIG. 6 indicates that the allocable-resource amount of the base station device 200-1 is 10.0.

The management apparatus 300 calculates the total used-resource amount of the unmanaged terminals 101 on the basis of the following Equation (2).

$$RS_{ba} = \Sigma RS_i \qquad (2)$$

In Equation (2), $RS_{ba}$ represents an allocable-resource amount of the base station device 200 and $\Sigma RS_i$ represents the total sum of used-resource amounts of terminal devices wirelessly coupled to the base station device 200. Equation (2) is an equation indicating that the total sum of used-resource amounts of the terminal devices wirelessly coupled to the base station device 200 is the allocable-resource amount of the base station device 200. That is, the management apparatus 300 calculates the total used-resource amount of the unmanaged terminals 101 with the assumption that the entire allocable-resource amount of the base station device 200 is allocated to terminal devices coupled thereto.

The management apparatus 300 calculates, as the total used-resource amount of the unmanaged terminals 101, a value (10.0−5.0=5.0) which is obtained by subtracting the sum (2.5+2.5=5.0) of the used-resource amounts of the managed terminals 100-1 and 100-2 from the allocable-resource amount (10.0) of the base station device 200-1.

Returning to the flowchart of FIG. 4, on the basis of the calculated total resource amount of the unmanaged terminals 101, the management apparatus 300 calculates the number of unmanaged terminals 101 coupled to the base station device 200-1 (S103). The management apparatus 300 calculates the number of unmanaged terminals 101 on the basis of the following Equation (3).

$$RS_i = RS_{i+1} \quad (3)$$

In Equation (3), $RS_{i+1}$ represents a used-resource amount of a terminal device i+1. That is, Equation (3) is an equation indicating that the used-resource amounts are the same for all the terminal devices coupled to the base station device 200. Since the used-resource amount of the managed terminal 100-1 is 2.5, the management apparatus 300 considers that the used-resource amount per one unmanaged terminal 101 is also 2.5. Then, the management apparatus 300 calculates, as the number of unmanaged terminals 101, a value (2) which is obtained by dividing the total used-resource amount (5.0) of the unmanaged terminals 101 by the used-resource amount (2.5) per one unmanaged terminal 101.

Returning to the flowchart of FIG. 4, on the basis of the number of coupled managed terminals 100 and unmanaged terminals 101 after the change in coupling status, the management apparatus 300 estimates respective throughputs of managed terminals 100 (S104). In the estimation of the respective throughputs of managed terminals 100, the management apparatus 300 calculates respective used-resource amounts of the managed terminals 100 after the change in coupling status.

The management apparatus 300 uses Equations (2) and (3) to calculate the respective used-resource amounts of the managed terminals 100. Then, the management apparatus 300 calculates the respective used-resource amounts of the managed terminals 100 with the assumption that the number of coupled unmanaged terminals 101 is not changed.

According to Equations (2) and (3), the management apparatus 300 determines that the allocable-resource amount (10.0) of the base station device 200-1 is evenly provided to five terminal devices in total, including three managed terminals 100-1 to 100-3 and two unmanaged terminals, and calculates the used-resource amount of each terminal device as 2.0 (=10.0÷5).

Then, the management apparatus 300 estimates the respective throughputs of the managed terminals 100-1 to 100-3 on the basis of Equation (1).

FIG. 7 is a diagram illustrating an example of results of estimation of throughputs of the managed terminals 100-1 to 100-3 performed by the management apparatus 300. As illustrated in FIG. 7, the throughput of the managed terminal 100-1 is 2.0 (2.0×1.0) Mbps since its used-resource amount is 2.0 and its communication rate is 1.0. The throughput of the managed terminal 100-2 is 4.0 (2.0×2.0) Mbps since its used-resource amount is 2.0 and its communication rate is 2.0. The throughput of the managed terminal 100-3 is 2.0 (2.0×1.0) Mbps since its used-resource amount is 2.0 and its communication rate is 1.0.

The first embodiment is not a case where traffic volumes required by different terminal devices (e.g., wireless resource occupancy of the respective terminal devices) are different, but a case where all terminal devices require the maximum traffic volume. For example, when the managed terminals 100 require different traffic volumes, the management apparatus 300 may calculate resource amounts according to the traffic amounts requested by the managed terminals 100 and estimate throughputs on the basis of the calculated resource amounts. When the managed terminals 100 require different traffic volumes, the number of unmanaged terminals 101 calculated by the management apparatus 300 is a pseudo number derived with the assumption that the unmanaged terminals 101 request the maximum traffic volume, and may be different from the number of unmanaged terminals 101 actually wirelessly coupled.

The management apparatus 300 may exclude the number of managed terminals 100 that are wirelessly coupled but rarely conduct communication from the number of managed terminals 100 after the change in coupling status, thereby improving the accuracy of throughput estimation.

In the first embodiment, the management apparatus 300 calculates the used-resource amount from the throughput of the managed terminal 100. Then, the management apparatus 300 calculates the used-resource amount of the unmanaged terminals 101 on the basis of the used-resource amounts of the managed terminals 100. Further, the management apparatus 300 calculates the number of wirelessly-coupled unmanaged terminals 101 from the used-resource amount of the unmanaged terminals 101. By calculating the number of wirelessly-coupled unmanaged terminals 101, the management apparatus 300 may calculate the used-resource amounts of terminal devices coupled to the base station device 200 when a managed terminal 100 is newly coupled to the base station device 200, thereby allowing the throughput estimation. As a result, even when managed terminals share and use the same network with a plurality of unmanaged terminals, the management apparatus 300 may estimate respective throughputs of managed terminals 100 in a case where the coupling status of the managed terminals 100 is changed.

Second Embodiment

In a second embodiment, it is assumed that the radio communication system 10 illustrated in FIG. 1 is a communication system conforming to wireless local area network (WLAN).

The configuration of the radio communication system 10 according to the second embodiment will be described with reference to FIG. 1. In the second embodiment, like elements and parts as the first embodiment are denoted by like reference numerals and description thereof will not be repeated for the sake of brevity.

The radio communication system 10 is, for example, a communication system conforming to WLAN. The base station device 200 is, for example, an access point in the communication system conforming to WLAN.

As in the first embodiment, an exemplary process of estimating the throughputs of the respective managed terminals 100-1 to 100-3 when the managed terminal 100-3 is newly coupled to the base station device 200-1 will be described. In the following description, the radio resource amount is, for example, a time length of time taken for the base station device 200 to transmit a predetermined amount of data (e.g., packets) to the managed terminals 100 and the unmanaged terminals 101.

The management apparatus 300 acquires from the managed terminals 100-1 and 100-2 throughputs between the respective managed terminals 100-1 and 100-2 and the base station device 200-1 wirelessly coupled thereto.

On the basis of the acquired throughputs, the management apparatus 300 calculates a radio resource amount (first radio resource amount) used by each of the managed terminals 100-1 and 100-2.

On the basis of the calculated radio resource amounts of the managed terminals 100-1 and 100-2 and a radio resource amount (e.g., total time length of time taken for the base station device 200-1 to transmit one packet to all the terminal devices wirelessly coupled thereto) which may be provided by the base station device 200-1 to the managed terminals and the unmanaged terminals, the management apparatus 300 calculates a radio resource amount (second radio resource amount) used by the unmanaged terminals 101.

Then, on the basis of the radio resource amounts of the managed terminals 100 and the unmanaged terminals 101, the management apparatus 300 calculates a radio resource amount used by each of the managed terminals 100-1 to 100-3 when the managed terminal 100-3 is newly wirelessly coupled. Then, the management apparatus 300 estimates the respective throughputs of the managed terminals 100-1 to 100-3 on the basis of the calculated radio resource amounts.

Figure 8:
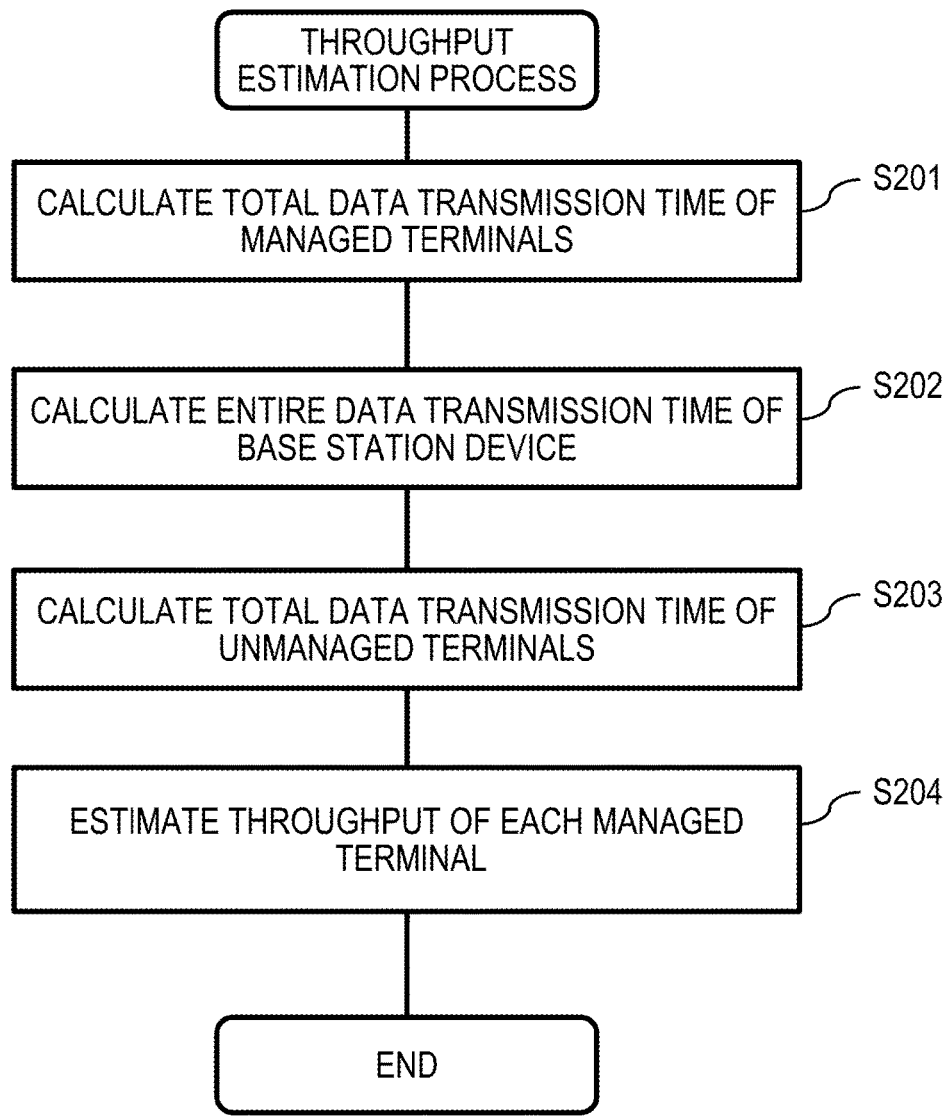
FIG. 8 is a flowchart illustrating a throughput estimation process performed by a management apparatus.

FIG. 8 is a flowchart illustrating the throughput estimation process performed by the management apparatus 300. When an opportunity to perform the throughput estimation process comes, the management apparatus 300 performs the throughput estimation process. The flowchart of FIG. 8 will be described below with the assumption that the opportunity to perform the throughput estimation process in the present embodiment is when the management apparatus 300 detects, in FIG. 1, that the managed terminal 100-3 is wirelessly coupled to the base station device 200-1.

In the throughput estimation process, the management apparatus 300 calculates total data transmission time of the managed terminals 100 wirelessly coupled to the base station device 200-1 for which the throughput is to be estimated (S201). The management apparatus 300 calculates the total data transmission time of the managed terminals 100 on the basis of the terminal information table 323.

FIG. 9 is a diagram illustrating an example of the terminal information table 323. FIG. 9 illustrates an example of the terminal information table 323, for example, at the time when the management apparatus 300 performs the throughput estimation process.

The management apparatus 300 acquires, for example, a coupled base station device, a base station device to be coupled, a throughput, a communication rate, and a packet size (data amount included in a packet) from the managed terminals 100-1 to 100-3. The communication rate in the second embodiment is individual data transmission time of the base station device 200 for the managed terminals 100-1 to 100-3. The individual data transmission time is, for example, packet transmission time taken for the base station device 200 to transmit one packet to the relevant managed terminals 100. The packet size may be acquired from the base station device 200 instead of the managed terminal 100.

The individual data transmission time is determined by the radio wave intensity of radio wave received by the relevant terminal device from the base station device 200. The individual data transmission time may be calculated by the managed terminal 100, or the management apparatus 300 may receive the radio wave intensity from the managed terminal 100 and calculate the individual data transmission time on the basis of the received radio wave intensity.

The management apparatus 300 calculates the total data transmission time of the managed terminals 100 as 20.0 (5.0+15.0) msec on the basis of the terminal information table 323 illustrated in FIG. 9.

Returning to the flowchart of FIG. 8, the management apparatus 300 calculates the entire data transmission time of the base station device 200-1 (S202). The entire data transmission time of the base station device 200-1 is the total time taken for the base station device 200-1 to transmit one packet to all the terminal devices wirelessly coupled. In the second embodiment, it is assumed that all the terminal devices perform communication without being interrupted. With this assumption, the number of packet transmissions per unit time may be assumed to be the same for all the terminal devices.

The management apparatus 300 calculates the entire data transmission time on the basis of the following Equation (4).

$$TP_i = PS_i \div T_{all} \quad (4)$$

In Equation (4), $PS_i$ represents a packet size of a terminal device i and $T_{all}$ represents the entire data transmission time of the base station device 200. That is, Equation (4) is an equation indicating that all the terminal devices have the same throughput when all the terminal devices have the same packet size. On the basis of the throughput (2.0 Mbps) and the packet size (80,000 bits) of the managed terminal 100-1, the management apparatus 300 calculates the entire data transmission time as 40.0 msec.

Returning to the flowchart of FIG. 8, the management apparatus 300 calculates the total data transmission time of the unmanaged terminals 101 on the basis of the calculated entire data transmission time (S203). Since the entire data transmission time is the sum of the total data transmission time of the managed terminals 100 and the total data transmission time of the unmanaged terminals 101, the total data transmission time of the unmanaged terminals 101 is calculated as 20.0 (40.0–20.0) msec.

Then, the management apparatus 300 estimates respective throughputs of managed terminals 100 on the basis of the total data transmission time of the unmanaged terminals 101 and the total data transmission time of the managed terminals 100 after the change in coupling status (S204).

The management apparatus 300 calculates the entire data transmission time of the base station device 200-1 after the change in coupling status. At this time, the management apparatus 300 assumes that the coupling status of the unmanaged terminals 101 is not changed. The management apparatus 300 adds the data transmission time of the newly-coupled managed terminal 100-3 and calculates the entire data transmission time as 60.0 (40.0+20.0) msec.

Then, the management apparatus 300 estimates the respective throughputs of managed terminals 100 on the basis of Equation (4).

FIG. 10 is a diagram illustrating an example of throughputs of managed terminals 100-1 to 100-3 estimated by the management apparatus 300. The management apparatus 300 estimates, as the respective throughputs of the managed terminals 100-1 to 100-3, a numerical value (1.3 Mbps) which is obtained by dividing the packet size (80,000 bits) of the managed terminals 100-1 to 100-3 by the entire data transmission time (60.0 msec).

In the second embodiment, the management apparatus 300 calculates the entire data transmission time of the base station device 200 from the throughput and the data size (packet size) of the managed terminals 100. Then, the management apparatus 300 adds the data transmission time of the newly-coupled managed terminal 100 to the calculated entire data transmission time, thereby calculating the entire data transmission time after the change in coupling status. The management apparatus 300 may estimate the respective throughputs of managed terminals 100 on the basis of the entire data transmission time and the data size (packet size). As a result, similarly to the case where the radio communication system 10 conforms to LTE, even when managed terminals share and use the same network with a plurality of unmanaged terminals, the management apparatus 300 may estimate respective throughputs of managed terminals 100 in a case where the coupling status of the managed terminals 100 is changed.

Third Embodiment

In a third embodiment, with the assumption that the radio communication system 10 illustrated in FIG. 1 is a communication system conforming to LTE, the management apparatus 300 calculates an allocable-resource amount (base station radio resource amount) of the base station device 200.

Figure 11:
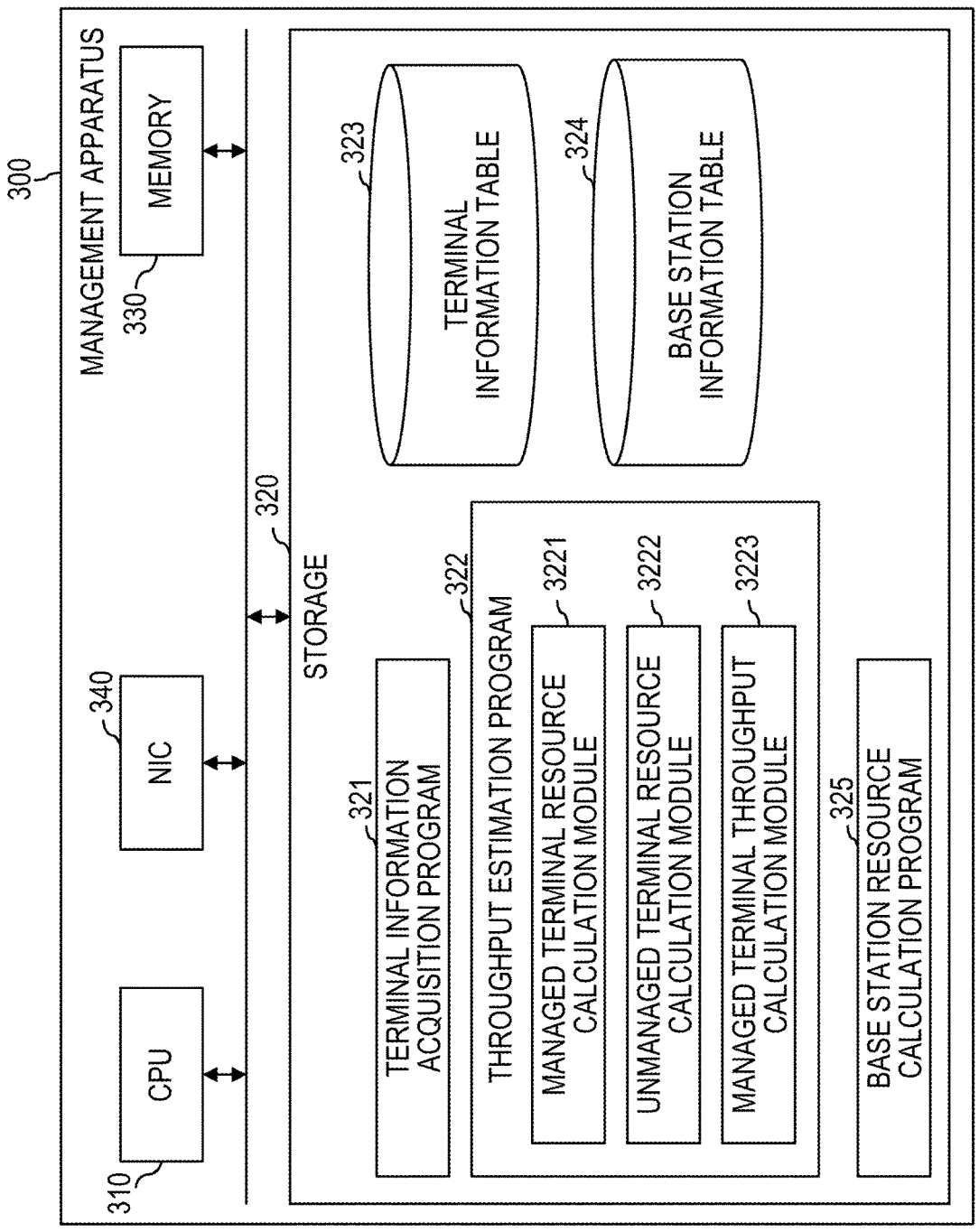
FIG. 11 is a diagram illustrating an exemplary configuration of a management apparatus.

FIG. 11 is a diagram illustrating an exemplary configuration of a management apparatus 300. The storage 320 further stores therein a base station resource calculation program 325.

By executing the base station resource calculation program 325, the CPU 310 implements a base station resource calculation unit that performs a base station resource calculation process. The base station resource calculation process is a process of calculating an allocable-resource amount of the base station device 200. The base station device 200 is managed, for example, by an operator that provides a communication network. Therefore, when a communication network operator and an operator of the management apparatus 300 are different, the management apparatus 300 may be unable to acquire the allocable-resource amount of the base station device 200 in advance. In this case, the management apparatus 300 performs the base station resource calculation process to calculate the allocable-resource amount of the base station device 200.

Further, by executing the terminal information acquisition program 321, the CPU 310 further implements a storage unit that performs a terminal information storage process. The terminal information storage process is a process of storing terminal information in the terminal information table 323. The terminal information table 323 stores therein latest predetermined pieces of acquired terminal information.

The management apparatus 300 calculates the allocable-resource amount of the base station device 200 on the basis of Equations (1) to (3) described in the first embodiment. For example, the management apparatus 300 calculates the allocable-resource amount of the base station device 200-1 on the basis of respective pieces of terminal information before and after the managed terminal 100-3 in FIG. 1 is wirelessly coupled to the base station device 200-1.

FIGS. 12A and 12B are diagrams illustrating examples of the respective pieces of terminal information before and after the managed terminal 100-3 in FIG. 1 is wirelessly coupled to the base station device 200-1. FIG. 12A illustrates an example of terminal information before the managed terminal 100-3 is wirelessly coupled and FIG. 12B illustrates an example of terminal information after the managed terminal 100-3 is wirelessly coupled.

On the basis of Equation (1), the management apparatus 300 calculates used-resource amounts of the managed terminal 100 in FIGS. 12A and 12B, respectively. As a result of the calculation, the number of managed terminals before the managed terminal 100-3 is wirelessly coupled is two and each used-resource amount thereof is 2.5. The number of managed terminals after the managed terminal 100-3 is wirelessly coupled is three and each used-resource amount thereof is 2.0.

On the basis of Equation (3), the management apparatus 300 considers that the used-resource amount of each unmanaged terminal 101 and the used-resource amount of each managed terminal 100 are the same. Then, the management apparatus 300 substitutes the used-resource amounts of the managed terminals 100 and the number (X) of unmanaged terminals 101 into Equation (2) for the respective cases of before and after the managed terminal 100-3 is wirelessly coupled.

Before the managed terminal 100-3 is wirelessly coupled, the total used-resource amount of the managed terminals 100-1 and 100-2 is 5.0 (2.5+2.5). Since the used-resource amount per one unmanaged terminal 101 is the same as the used-resource amount per one managed terminal 100, the total used-resource amount of the unmanaged terminals 101 is 2.5X. The sum of the total used-resource amount of the managed terminals 100 and the total used-resource amount of the unmanaged terminals 101 is an allocable-resource amount of the base station device 200-1 (from Equation (2)). Therefore, substituting the respective total used-resource amounts into Equation (2) yields the following Equation (2-1).

$$RS_{ba}=5.0+2.5X \qquad (2\text{-}1)$$

After the managed terminal 100-3 is wirelessly coupled, the total used-resource amount of the managed terminals 100-1 to 100-3 is 6.0 (2.0+2.0+2.0). Then, the total used-resource amount of the unmanaged terminals 101 is 2.0X. Substituting the respective total used-resource amounts in Equation (2) yields the following Equation (2-2).

$$RS_{ba}=6.0+2.0X \qquad (2\text{-}2)$$

The management apparatus 300 may calculate X=2 and $RS_{ba}$=10.0 from Equations (2-1) and (2-2). That is, the management apparatus 300 calculates the allocable-resource amount of the base station device 200-1 as 10.0.

In the third embodiment, the management apparatus 300 may calculate the allocable-resource amount of the base station device 200 by acquiring a plurality of pieces of terminal information at different timings at which the coupling status is different. As a result, even when the allocable-resource amount of the base station device 200 is not stored in advance, the management apparatus 300 may estimate the respective throughputs of the managed terminals 100 after the change in coupling status.

The management apparatus 300 may calculate the allocable-resource amount of the base station device 200, for example, when new terminal information is acquired. Therefore, the management apparatus 300 may calculate the allocable-resource amount of the base station device 200 using the latest terminal information.

The allocable-resource amount of the base station device 200 may be changed, for example, by an administrator of the base station device 200 during the operation of the radio communication system 10. In order to monitor whether the allocable-resource amount of the base station device 200 is changed, the management apparatus 300 stores an allocable-resource amount calculated at the previous time in a memory and compares it with an allocable-resource amount calculated this time. When the allocable-resource amounts of the previous time and the present time are separated from each other by a predetermined value or more, the management apparatus 300 determines that the allocable-resource amount has been changed. In this case, for example, the management apparatus 300 waits for the next terminal information to be acquired, calculates an allocable-resource amount, and estimates the respective throughputs of the managed terminals 100. In this case, the management apparatus 300 may set the average value of the allocable-resource amount calculated at the previous time and the allocable-resource amount calculated at this time as the allocable-resource amount of the base station device 200.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A management apparatus, comprising:
a memory; and
a processor coupled to the memory and the processor configured to:
acquire first throughputs from first terminals, the first throughputs being throughputs between a base station device and the first terminals, the base station device providing a third amount of radio resources to a plurality of terminal devices wirelessly coupled to the base station device, the first terminals being part of managed terminals managed by the management apparatus and included in the plurality of terminal devices;
calculate a first amount of the radio resources used by the first terminals on basis of the first throughputs;
calculate a second amount of the radio resources used by second terminals different from the first terminals on basis of the first amount and the third amount, the second terminals being included in the plurality of terminal devices;
calculate a first after-change amount on basis of the first amount and the second amount, the first after-change amount being an amount of the radio resources used by after-change terminals, the after-change terminals being part of the managed terminals and wirelessly coupled to the base station device after a status of coupling the managed terminals to the base station device is changed; and
estimate after-change throughputs on basis of the first after-change amount, the after-change throughputs being throughputs between the base station device and the after-change terminals.

2. The management apparatus according to claim 1, wherein
each of the first amount, the second amount, and the third amount is an amount of resource blocks each having a predetermined time length and a predetermined frequency bandwidth, and
the base station device provides a quota amount to each of the plurality of terminal devices, the quota amount being obtained by dividing the third amount evenly for the plurality of terminal devices.

3. The management apparatus according to claim 2, wherein the processor is configured to:
acquire communication rates of the first terminals, the communication rates indicating ratios of the first throughputs of the first terminals to the quota amount;
calculate the first after-change amount on basis of the first throughputs and the communication rates; and
calculate the after-change throughputs on basis of the first after-change amount and the communication rates.

4. The management apparatus according to claim 3, wherein the processor is configured to:
calculate a second number of the second terminals on basis of the second amount; and
calculate the first after-change amount on basis of the second number and a first number of the after-change terminals.

5. The management apparatus according to claim 1, wherein
each of the first amount, the second amount, and the third amount is a time length of time taken for the base station device to transmit packets to the plurality of terminal devices, and
the third amount is a total time length of time taken for the base station device to transmit one packet to each of the plurality of terminal devices.

6. The management apparatus according to claim 5, wherein the processor is configured to:
calculate the third amount on basis of the first throughputs and an amount of data included in each packet;
calculate a second after-change amount on basis of the first after-change amount, the second after-change amount being an amount of the radio resources provided by the base station device to a plurality of terminal devices wirelessly coupled to the base station device after the change; and
estimate the after-change throughputs on basis of the second after-change amount.

7. The management apparatus according to claim 1, wherein the processor is configured to:
store the first throughputs in the memory; and
calculate the third amount on basis of the stored first throughputs.

8. The management apparatus according to claim 7, wherein the processor is configured to:
calculate the third amount on basis of first stored throughputs and second stored throughputs, the first stored throughputs being acquired at a first time point and stored in the memory, the second stored throughputs being acquired at a second time point earlier than the first time point and stored in the memory.

9. The management apparatus according to claim 8, wherein the processor is configured to:
calculate the third amount when the first throughputs are acquired.

10. The management apparatus according to claim 7, wherein the processor is configured to:
calculate a first base amount on basis of first stored throughputs and second stored throughputs, the first stored throughputs being acquired at a first time point and stored in the memory, the second stored throughputs being acquired at a second time point earlier than the first time point and stored in the memory;

calculate a second base amount on basis of the second stored throughputs and third stored throughputs, the third stored throughputs being acquired at a third time point earlier than the second time point and stored in the memory; and calculate the third amount on basis of the first base amount and the second base amount when the first base amount and the second base amount are different from each other by a predetermined amount or more, the third amount being different from the first base amount and the second base amount.

11. The management apparatus according to claim 10, wherein the third amount is an average of the first base amount and the second base amount.

12. A radio communication system, comprising:

a base station device including a first processor configured to provide a third amount of radio resources to a plurality of terminal devices wirelessly coupled to the base station device;

managed terminals configured to be wirelessly coupled to the base station device and including a second processor configured to transmit throughputs thereof when wirelessly coupled to the base station device; and a management apparatus configured to manage the managed terminals and including a third processor configured to:

acquire first throughputs from first terminals, the first throughputs being throughputs between the base station device and the first terminals, the first terminals being part of the managed terminals and included in the plurality of terminal devices;

calculate a first amount of the radio resources used by the first terminals on basis of the first throughputs;

calculate a second amount of the radio resources used by second terminals different from the first terminals on basis of the first amount and the third amount, the second terminals being included in the plurality of terminal devices;

calculate a first after-change amount on basis of the first amount and the second amount, the first after-change amount being an amount of the radio resources used by after-change terminals, the after-change terminals being part of the managed terminals and wirelessly coupled to the base station device after a status of coupling the managed terminals to the base station device is changed; and estimate after-change throughputs on basis of the first after-change amount, the after-change throughputs being throughputs between the base station device and the after-change terminals.

13. A non-transitory computer-readable recording medium having stored therein a program that causes a computer to execute a process, the process comprising:

acquiring first throughputs from terminals, the first throughputs being throughputs between a base station device and the first terminals, the base station device providing a third amount of radio resources to a plurality of terminal devices wirelessly coupled to the base station device, the first terminals being part of managed terminals managed by the computer and included in the plurality of terminal devices;

calculating a first amount of the radio resources used by the first terminals on basis of the first throughputs;

calculating a second amount of the radio resources used by second terminals different from the first terminals on basis of the first amount and the third amount, the second terminals being included in the plurality of terminal devices;

calculating a first after-change amount on basis of the first amount and the second amount, the first after-change amount being an amount of the radio resources used by after-change terminals, the after-change terminals being part of the managed terminals and wirelessly coupled to the base station device after a status of coupling the managed terminals to the base station device is changed; and estimating after-change throughputs on basis of the first after-change amount, the after-change throughputs being throughputs between the base station device and the after-change terminals.

* * * * *